(12) United States Patent
Rajan

(10) Patent No.: US 8,943,295 B1
(45) Date of Patent: Jan. 27, 2015

(54) SYSTEM AND METHOD FOR MAPPING FILE BLOCK NUMBERS TO LOGICAL BLOCK ADDRESSES

(75) Inventor: Vijayan Rajan, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 486 days.

(21) Appl. No.: 12/287,714

(22) Filed: Oct. 10, 2008

Related U.S. Application Data

(63) Continuation of application No. 10/422,494, filed on Apr. 24, 2003, now Pat. No. 7,437,530.

(51) Int. Cl.
*G06F 12/00* (2006.01)
*G06F 12/10* (2006.01)

(52) U.S. Cl.
CPC ........ *G06F 12/1027* (2013.01); *G06F 12/1036* (2013.01)
USPC ........................................................ 711/206

(58) Field of Classification Search
None
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,403,639 A * | 4/1995 | Belsan et al. | 1/1 |
| 5,485,579 A | 1/1996 | Hitz et al. | |
| 5,634,096 A * | 5/1997 | Baylor et al. | 714/6.24 |
| 5,758,125 A | 5/1998 | Misinai et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 5,983,324 A * | 11/1999 | Ukai et al. | 711/137 |
| 6,038,570 A | 3/2000 | Hitz et al. | |
| 6,038,639 A * | 3/2000 | O'Brien et al. | 711/114 |
| 6,065,037 A | 5/2000 | Hitz et al. | |
| 6,138,126 A | 10/2000 | Hitz et al. | |
| 6,289,356 B1 | 9/2001 | Hitz et al. | |
| 6,321,276 B1 * | 11/2001 | Forin | 710/3 |
| 6,425,035 B2 | 7/2002 | Hoese et al. | |
| 7,107,385 B2 | 9/2006 | Rajan et al. | |
| 7,437,530 B1 | 10/2008 | Rajan | |
| 2002/0083120 A1 | 6/2002 | Soltis | |
| 2002/0112022 A1 | 8/2002 | Kazar et al. | |
| 2002/0116593 A1 | 8/2002 | Kazar et al. | |

(Continued)

OTHER PUBLICATIONS

Linux Filesystem, Jun. 19-21, 2001, available at http://www.inf.fu-berlin.de/lehre/SS01/OS/Lectures/Lecture16.pdf.*

(Continued)

*Primary Examiner* — Aimee Li
*Assistant Examiner* — Craig Goldschmidt
(74) *Attorney, Agent, or Firm* — Casari and McKenna, LLP

(57) ABSTRACT

A system and method for mapping file block numbers (FBNs) to logical block addresses (LBAs) is provided. The system and method performs the mapping of FBNs to LBAs in a file system layer of a storage operating system, thereby enabling the use of clients in a storage environment that have not been modified to incorporate mapping tables. As a result, a client may send data access requests to the storage system utilizing FBNs and have the storage system perform the appropriate mapping to LBAs.

21 Claims, 5 Drawing Sheets

(56) References Cited

U.S. PATENT DOCUMENTS

2002/0161982 A1* 10/2002 Riedel .......................... 711/170
2004/0230859 A1 11/2004 Cochran et al.

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Information Technology—Fibre Channel Protocol for SCSI, Second Version (FCP-2) Nov. 1, 2001.
Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.
David Hitz et al. TR3002 File System Design for a NFS File Server Appliance published by Network Appliance, Inc., Jan. 1994.
NCITS 332-1999 Fibre Channel Arbitrated Loop (FC-AL-2) published by the American National Standards Institute, Dec. 1999.
ANSI X3.230-1994, Fibre Channel Physical and Signaling Interface (FC-PH), Nov. 1994.

* cited by examiner

SYSTEM AND METHOD FOR MAPPING FILE BLOCK NUMBERS TO LOGICAL BLOCK ADDRESSES

RELATED APPLICATIONS

This application is a continuation of U.S. Ser. No. 10/422,494, issued as U.S. Pat. No. 7,437,530 on Oct. 14, 2008, filed by Vijayan Rajan on Apr. 24, 2003, entitled SYSTEM AND METHOD FOR MAPPING FILE BLOCK NUMBERS TO LOGICAL BLOCK ADDRESSES.

FIELD OF THE INVENTION

The present invention relates to storage systems and, in particular, to mapping file block numbers to logical block addresses.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

In certain storage system network environments, clients and/or users may desire the ease of use of a name space associated with a file-based protocol, such as that used in a NAS system. However, NAS-based protocols are typically slower than those utilized in a SAN environment due to increased protocol overhead. Previous storage system implementations typically utilized an approach that "disposed" the NAS capabilities over the SAN storage system platform using, e.g., a "sidecar" device attached to the SAN platform. An example of such a prior system is the Symetrix® System platform available from EMC® Corporation. Broadly stated, individual disks of the SAN storage system, i.e., Symetrix® System, are allocated to the NAS sidecar device (e.g., a Celera™ Device) that, in turn, exports those disks to NAS clients via, e.g., the NFS and CIFS file-based protocols.

In use, client of the storage system accesses the sidecar device to obtain a set of logical block addresses associated with the file to be accessed. The client of the storage system accesses the sidecar device by sending a set of file block numbers (FBNs) to the sidecar device. A FBN is a number describing a particular block within a file, with the first block of the file being numbered as FBN number one and each block thereafter being sequentially increased. A FBN does not necessarily bear a given relation to the location of data stored on physical blocks on a storage device, such as a disk, but instead refers to the actual ordering of data within a file. From the sidecar device, the client receives a set of logical block addresses (LBAs) that reference actual physical blocks stored on the disks storing the data. For example, file block number one of a particular file may map to a logical block address of, for example, 5,016. In other words, the first file block, containing the initial data of the file, is stored in the $5,016^{th}$ disk block on the set of disks storing the file.

The client then accesses the conventional SAN storage system using the set of logical block addresses obtained from the NAS sidecar. For example, a client may issue a small computer system interface (SCSI) command to the SAN storage system. In accordance with the SCSI protocol, locations within a file must be specified using a set of logical block addresses. Thus, the client utilizes the mapped LBAs obtained from the sidecar device in requesting its desired SCSI operation. A noted disadvantage of this approach is that the client software must be modified to incorporate the additional look up and mapping functionality required to enable the client to effectuate a sidecar FBN to LBA look up operation. This requirement adds additional complexity to the client and may generate incompatibility issues with other software executing on the client. Additionally, a provider of such storage systems must develop and implement a client-side mapping software module for each type of client system to be supported. Another noted disadvantage of such sidecar systems is that the client typically is required to send look up commands to the sidecar device over a NAS network path, which is typically slower than network paths utilized in a SAN environment. This increased use of typically slower network connections substantially impairs a storage system's performance by increasing the processing overhead required.

Thus, it is an object of the present invention to provide a system and method for a client to utilize the high-speed capabilities of a SAN arrangement for data access operations to the storage system without requiring modification of the client to utilize a sidecar type device.

SUMMARY OF THE INVENTION

The present invention overcomes the disadvantages of the prior art by providing a system and method for mapping file block numbers to logical block addresses used to access data stored on a storage appliance, such as a storage system. The system and method, illustratively implemented in a file system executing on the storage systems, maps file block numbers received from client software and applications to logical block addresses for use when communicating transparently with disk storage devices of the storage system.

Specifically, the system and method implement a mapping function from file block numbers to logical block addresses within a file system layer of a storage operating system executing on a the storage system. Thus, clients may direct commands and/or data access requests to a file block number when communicating with the storage system. The storage system, including the exemplary mapping function of the file system, will map the specified file block number to the appropriate logical block address identifying the location on the disks containing the specified data.

The system and method obviates the need for a client to first contact a sidecar device to perform the mapping function from the file block numbers to logical block addresses. Thus, the present invention enables improved data transfer and file system operation performance in a storage system environment.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System

Figure 1:
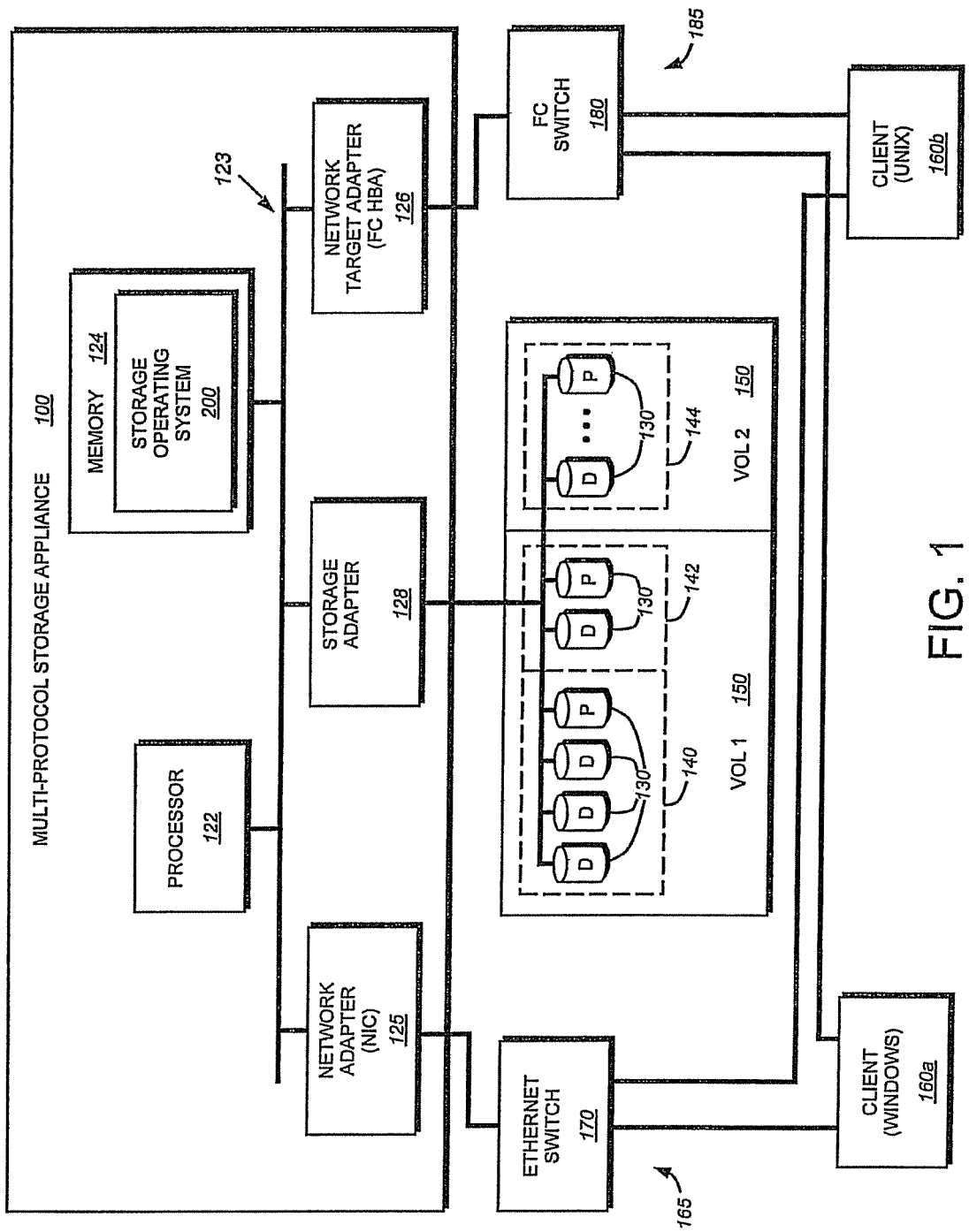
FIG. 1 is a schematic block diagram of a multi-protocol storage appliance environment in accordance with an embodiment of the present invention.

FIG. 1 is a schematic block diagram of the multi-protocol storage appliance 100 configured to provide storage service relating to the organization of information on storage devices, such as disks 130. The storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 125 couples the storage appliance to a plurality of clients 160a,b over point-to-point links, wide area networks (WANs), virtual private networks (VPNs) implemented over a public network (e.g., the Internet) or a shared local area network (LAN), hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP/IP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

When clients send SAN-based data access requests to the storage appliance, clients typically utilize logical block addresses that correspond to the individual data blocks stored on disk. However, in accordance with the teachings of the present invention, clients may utilize file block numbers when communicating data access requests to the storage system. The novel mapping function, described further below, performs the requisite mapping from file block numbers to logical block addresses to enable the storage system to access the specified data blocks.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in co-pending and commonly assigned U.S. Pat. No. 7,107,385, issued on Sep. 12, 2006, entitled STORAGE VIRTUALIZATION BY LAYERING VDISKS ON A FILE SYSTEM, by Vijayan Rajan, et al., which is hereby incorporated by reference as though fully set forth herein.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
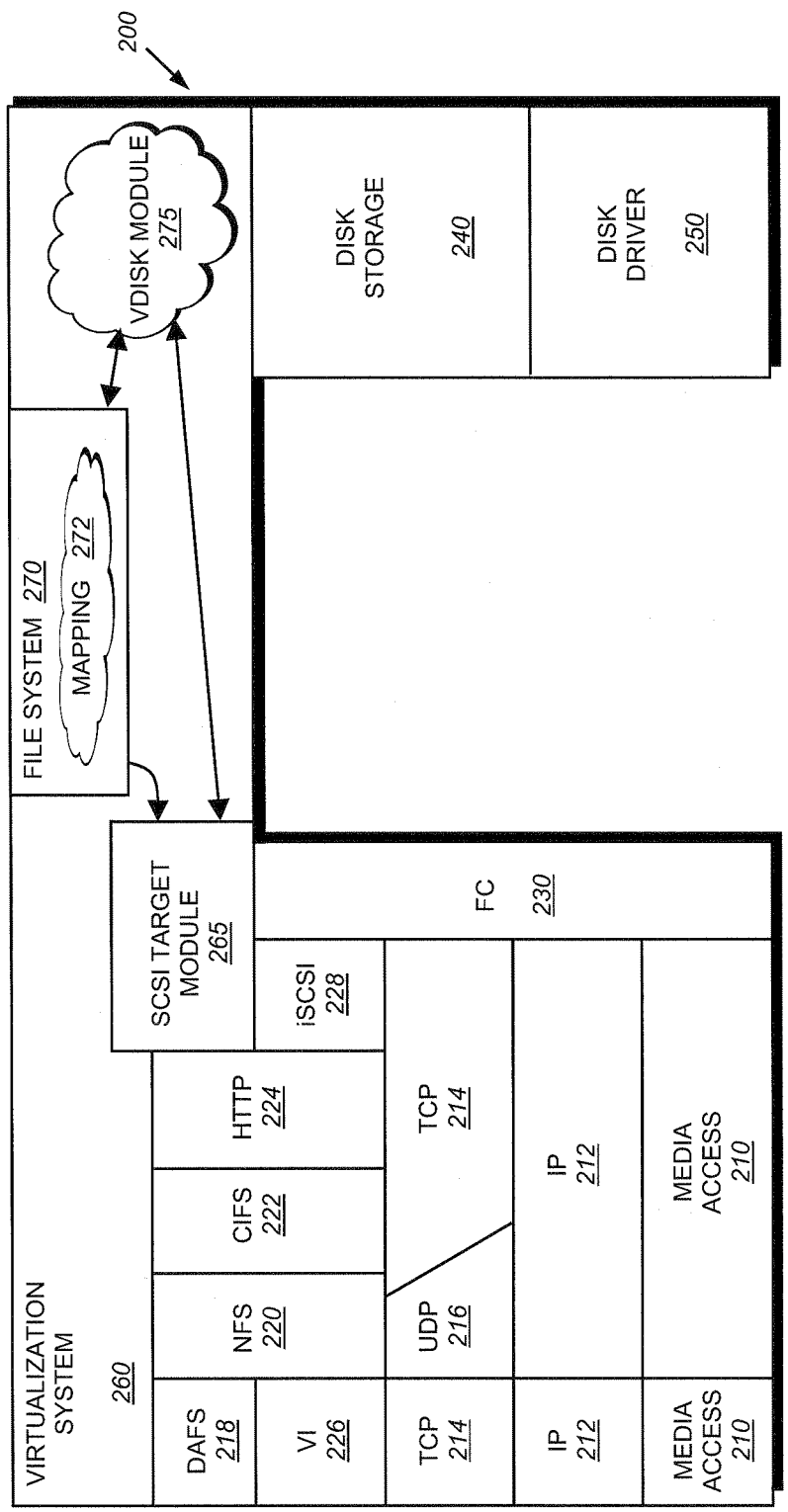
FIG. 2 is a schematic block diagram of an exemplary storage operating system of the multi-protocol storage appliance that may be advantageously used with an embodiment of the present invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 260 that is implemented by a file system 270 cooperating with a vdisk module 275 and SCSI target module 265. It should be noted that the vdisk module 275, file system 270 and SCSI target module 265 can be implemented in software, hardware, firmware, or a combination thereof. The vdisk module 275 is layered on (and interacts with) the file system 270 to provide a data path from the block-based SCSI target module to blocks managed by the file system.

The SCSI target module 265, in turn, initiates emulation of a disk or lun by providing a mapping procedure that translates logical block addresses to luns specified in access requests into virtual block access to the special vdisk file types and, for responses to the requests, vdisks into luns. The SCSI target module is illustratively disposed between the FC and iSCSI drivers 228, 230 and the file system 270 to thereby provide a translation layer of the virtualization system 260 between the SAN block (lun) space and the file system space, where luns are represented as vdisks.

The file system 270 illustratively implements the WAFL file system having an on-disk format representation that is block-based using, e.g., 4 kilobyte (KB) blocks and using modes to describe the files. The WAFL file system uses files to store meta-data describing the layout of its file system; these meta-data files include, among others, an mode file. A file handle, i.e., an identifier that includes an mode number, is used to retrieve an mode from disk. A description of the structure of the file system, including the mode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein. Included in the file system 270 is a mapping function 272, described further below, that performs the novel FBN to LBA mapping of the present invention.

C. Mapping File Block Numbers to Logical Block Addresses

In accordance with the illustrative embodiment of the present invention, clients may send a data access request to a storage system that includes file block numbers (FBNs). The storage system, and specifically in the illustrative embodiment, a mapping function 272 of storage operating system 200, maps the received FBN to the appropriate logical block address (LBA) that is associated with the file blocks stored on the disks associated with the storage system.

Figure 3:
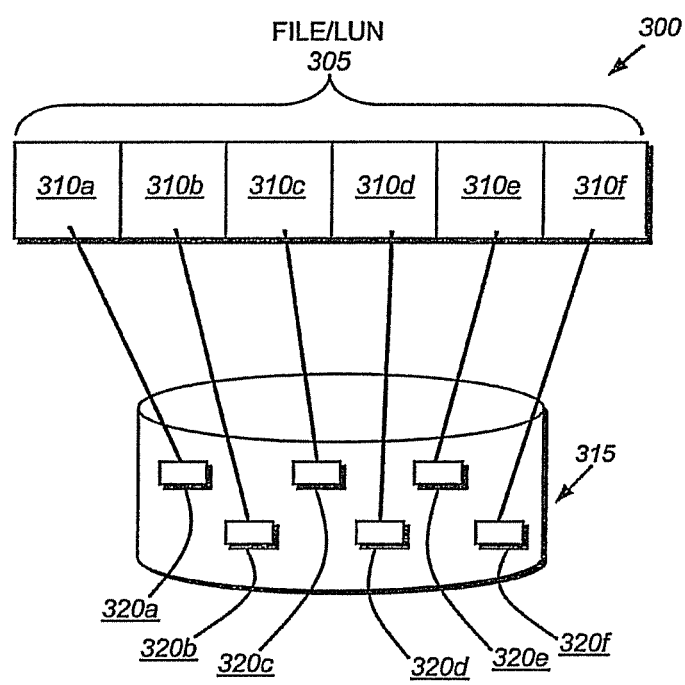
FIG. 3 is a schematic block diagram of an exemplary file/lun map showing blocks of the file/lun distributed among blocks on a disk in accordance with an embodiment of the present invention.

FIG. 3 shows a schematic block diagram of an exemplary mapping 300 of the blocks of a file or lun to blocks within a disk. The file or lun 305 comprises a series of blocks 310 a-f that are sequentially arranged to store the data comprising the specified file or lun. However, each of the file blocks 310 is stored in a physical disk block 320 a-f within a disk 315. Thus, for example, block 310a may have an FBN number of one, while block 310b would have an FBN number value of two, etc. However, the logical block address of the associated block stored on disk (320a) may have no relationship with the logical block address associated with block 320*b*. For example, block 320*b*, which corresponds to file block number 310*b*, could have a lower logical block address than block 320*b*, which corresponds to file block number 310*a*.

Figure 4:
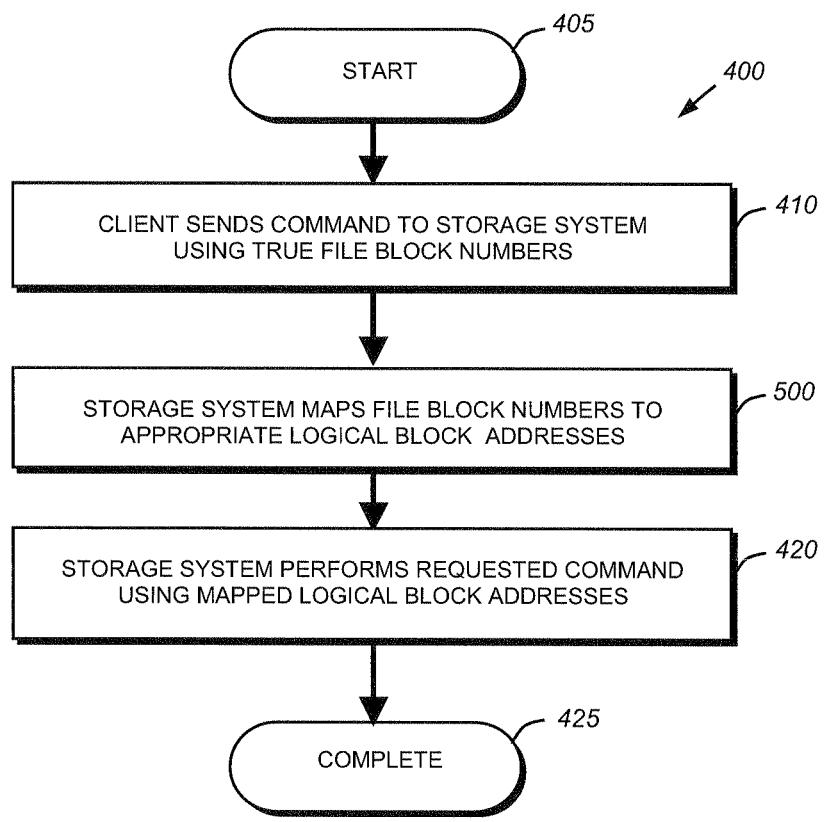
FIG. 4 is a flowchart detailing a procedure for a client to utilize a mapping of file block numbers to logical block addresses in accordance with an embodiment of the present invention.

A procedure 400 for mapping file block numbers (FBNs) to logical block addresses (LBAs) in accordance with an embodiment of the present invention is shown in FIG. 4. The procedure starts in step 405 and proceeds to step 410 where a client sends a command to the storage system using true FBNs to identify the blocks of the file to be modified. In response, the storage system, in step 500, maps the FBNs to the appropriate LBAs. This mapping function 272, in the illustrative embodiment, occurs in the file system layer 270 of the storage operating system 200 executing on the storage system 100. As the mapping function occurs on the storage system, the client is not required to be modified or to have any prior knowledge of the layout or disk geometry of the underlying storage medium. Specifically, the client is not required to have FBN to LBA mapping tables or be able to compute an appropriate LBA using other client specific methods. Next, in step 420, the storage system performs the requested command or operation using the appropriate mapped logical block addresses. Once the storage system has completed the command, the procedure is complete in step 425.

Figure 5:
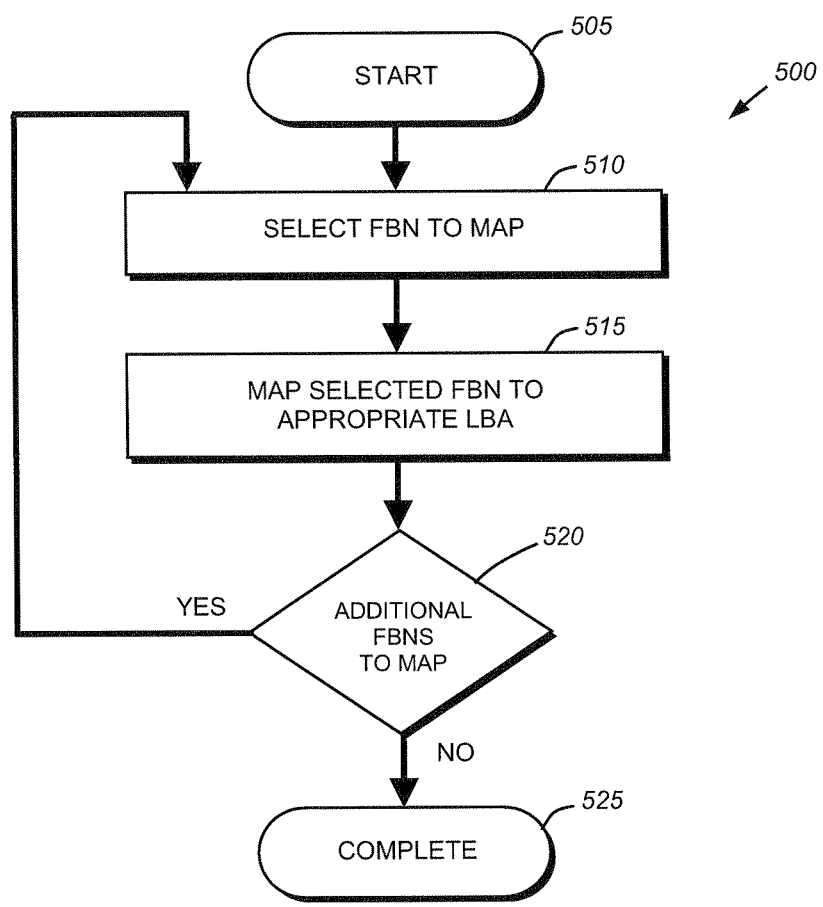
FIG. 5 is a flowchart detailing a procedure for mapping file block numbers to logical block addresses in accordance with an embodiment of the present invention.

FIG. 5 is a flow chart of a procedure 500 for mapping a set of FBNs to LBAs in accordance with an embodiment of the present invention. The procedure 500 begins in step 505 and proceeds to step 510 where a FBN is selected to be mapped. Next, in step 515, the FBN that was selected is mapped to the appropriate LBA. This may be accomplished in a variety of ways including, for example, the use of a mapping table maintained by the file system 270 of a storage operating system. Alternately, the mapping process within the file system layer of the storage operating system may compute the appropriate offset within a file from the file block number and determine the appropriate logical block address from the computed offset. It should be noted that these methods for mapping FBNs to LBAs are exemplary only and that the principles of the present invention may be practiced using any appropriate mapping function 272. Once the appropriate LBA has been determined for the selected FBN, the procedure proceeds to step 520 where it determines whether there are additional FBNs to map. If there are no additional FBNs to map, the procedure is then complete in step 525. Otherwise, the procedure loops back to step 510 and selects another FBN to map. Thus, the procedure 500 may map a plurality of FBNs that were, for example, submitted by a client to the storage system in a single data access request.

To again summarize, the present invention provides, in the illustrative embodiment, a mapping process and function of a storage operating system executing on a storm age system that maps file block numbers to appropriate logical block addresses. A client may communicate with the storage system utilizing file block numbers, which are a sequential ordering of blocks within a particular file. The storage operating system executing on the storage system will perform the appropriate mapping functionality of converting the FBNs into logical block addresses, which directly reference individual blocks on the disks storing the data.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method for a storage system to service a first access request for data, the method executed by the storage system, comprising:
  receiving from a client of the storage system the first access request including a file block number of a file indicating a first location within the data;
  mapping the file block number to a logical block address identifying a second location on a virtual disk (vdisk), the vdisk layered on a file system such that the vdisk is a multi-inode object associated with an inode and a stream inode of the file encapsulated as a single object, the file system stored on a storage medium operatively connected to the storage system;
  forming a second access request having the logical block address to access the data stored at the second location; and
  sending the accessed data to the client in response to the first access request.

2. The method of claim 1, wherein the file block number corresponds to an ordinal location of a block within the file.

3. The method of claim 1, wherein the logical block address comprises a value identifying a block stored on the storage medium.

4. The method of claim 1, wherein the first access request comprises a set of file block numbers.

5. The method of claim 1, wherein the storage medium comprises a storage volume including a plurality of storage devices.

6. The method of claim 1, wherein mapping further comprises computing an offset within the data using the file block number.

7. The method of claim 1 wherein the first access request is sent over a network segment selected from a group consisting of Fibre Channel (FC) and Ethernet.

8. A storage system for servicing a first data access request, comprising:
  a network interface configured to receive the first data access request from a client of the storage system, wherein the first data access request includes a file block number indicating a location within a file;
  a storage operating system executed by a processor of the storage system, the storage operating system configured to map the file block number to a logical block address of a virtual disk (vdisk), the vdisk layered on a file system such that the vdisk is a multi-inode object associated with an inode and a stream inode of the file encapsulated as a single object, the file system stored on a storage medium of the storage system,
  the storage operating system further configured to form a second data access request having the mapped logical block address,
  the storage operating system further configured to access data at the logical block address of the vdisk; and
  the network interface further configured to send, to the client, the accessed data in response to the first data access request.

9. The storage system of claim 8, wherein the storage system comprises both block-based and file-based protocol services.

10. The storage system of claim 8, wherein the file block number corresponds to an ordinal location of a block within the file.

11. The storage system of claim 8, wherein the storage operating system is further configured to map the file block number using a mapping table.

12. The storage system of claim 8, wherein the storage medium includes a plurality of disks.

13. The storage system of claim 8, wherein the storage operating system is further configured to compute an offset within the file using the file block number.

14. The storage system of claim 8, wherein the storage operating system is further configured to send the accessed data using a file-based protocol.

15. The storage system of claim 8, wherein the vdisk consumes no storage space at creation.

16. A non-transitory computer readable storage medium containing executable program instructions for execution by a processor, comprising:
   program instructions that receive, from a client of a storage system, a first request to perform an operation, the first request including a file block number, wherein the file block number corresponds to an ordinal location of a block within a file;
      program instructions that map, by the storage system, the file block number to a logical block address of a virtual disk (vdisk), the vdisk layered on a file system such that the vdisk is a multi-inode object associated with an inode and stream inode of the file encapsulated as a single object, the file system stored on a storage medium operatively connected to the storage system;
   program instructions that perform, by the storage system, the operation using the mapped logical block address to form a second request having the mapped logical block address; and
   program instructions that complete the first request in response to performing the operation.

17. A method to utilize file block numbers in a single data access command received at a storage system, comprising:
   receiving the single data access command from a client of the storage system, the single data access command identifying a plurality of locations within a file using a set of file block numbers;
   maintaining a stable of the set of file block numbers to a set of logical block addresses;
   mapping via table the set of file block numbers to the set of logical block addresses of a virtual disk (vdisk), the vdisk layered on a file system such that the vdisk is a multi-inode object associated with an inode and a stream inode of the file encapsulated as a single object, the file system stored on a storage medium operatively connected to the storage system;
   accessing, by the storage system, data located on the vdisk at one or more logical block addresses of the set of logical block addresses; and
   transmitting the accessed data in response to the single data access command.

18. The method of claim 17, wherein the stream inode has attributes including geometry information of the vdisk.

19. The method of claim 18, wherein mapping the set of file block numbers to the set of logical block addresses further comprises computing an offset within the file for each file block number of the set of file block numbers.

20. The method of claim 18, wherein the vdisk consumes no storage space at creation.

21. The method of claim 18, wherein the single data access command is sent using a block-based protocol selected from a group consisting of iSCSI and FCP.

* * * * *

UNITED STATES PATENT AND TRADEMARK OFFICE
CERTIFICATE OF CORRECTION

PATENT NO. : 8,943,295 B1
APPLICATION NO. : 12/287714
DATED : January 27, 2015
INVENTOR(S) : Vijayan Rajan It is certified that error appears in the above-identified patent and that said Letters Patent is hereby corrected as shown below:

In the Specification:
Col. 8, line 31 should read:
inodes to describe the files. The WAFL file system uses files Col. 8, lines 33-36 should read:
these meta-data files include, among others, an inode file. A file handle, i.e., an identifier that includes an inode number, is used to retrieve an inode from disk. A description of the structure of the file system, including the inode file, is pro- Col. 9, line 51 should read:
storage operating system executing on a storage system In the Claims:
Claim 17, Col. 12, line 9 should read:
maintaining a table of the set of file block numbers to a set Claim 17, Col. 12, line 11 should read:
mapping via the table the set of file block numbers to the set of Claim 19, Col. 12, line 25 should read:
19. The method of claim 17, wherein mapping the set of file Claim 20, Col. 12, line 29 should read:
20. The method of claim 17, wherein the vdisk consumes Claim 21, Col. 12, line 31 should read:
21. The method of claim 17, wherein the single data access Signed and Sealed this
Ninth Day of June, 2015

Michelle K. Lee
*Director of the United States Patent and Trademark Office*